United States Patent Office 3,794,662
Patented Feb. 26, 1974

3,794,662
METHOD OF MAKING ARALKYL, CHLORO MALEIC AND GLUTARIC ANHYDRIDES
Louis Schmerling, Riverside, Ill., assignor to Universal Oil Products Company, Des Plaines, Ill.
No Drawing. Filed Mar. 15, 1971, Ser. No. 124,438
Int. Cl. C07c 57/02, 57/14
U.S. Cl. 260—345.9                9 Claims

ABSTRACT OF THE DISCLOSURE

Aralkyl-substituted halogenated unsaturated polybasic acid anhydrides are prepared by condensing alkylaromatic compounds with polyhalo-substituted unsaturated polybasic acid anhydrides in the presence of free radical-generating compounds at elevated temperatures to produce the desired products.

---

This invention relates to a process for preparing aralkyl-substituted polybasic acid anhydrides and particularly to a process for preparing aralkyl-substituted halogenated unsaturated polybasic acid anhydrides. The products which may be prepared according to the process of this invention are useful in the chemical industry, and particularly as intermediates in the preparation of plastics and polymers, the finished products possessing the desirable characteristics of flame retardancy greater than that which is possessed by polymers or plastics which do not contain, as one component thereof, the products of the present invention. It is contemplated that the aralkyl-substituted halogenated unsaturated polybasic acid anhydrides which are prepared according to the process of this invention may be utilized as such or may be further halogenated and particularly chlorinated, thereafter condensed with a diene such as butadiene and then with a polyhalo-substituted cyclopentadiene such as hexachloropentadiene to yield products which possess excellent flame retardant or fire resistant characteristics, especially when incorporated in plastics or polymers.

It is therefore an object of this invention to provide a process for preparing desirable chemical compositions of matter.

A further object of this invention is to provide a process for condensing certain alkylaromatic hydrocarbons with polyhalo, and particularly polychloro, substituted unsaturated polybasic acid anhydrides to form the desired products.

In one aspect an embodiment of this invention resides in a process for the preparation of an aralkyl-substituted halogenated unsaturated polybasic acid anhydride which comprises condensing an alkylaromatic compound with a polyhalo-substituted unsaturated polybasic acid anhydride in the presence of a free-radical-generating compound at condensation conditions, and recovering the resultant aralkyl-substituted halogenated unsaturated polybasic acid anhydride.

A specific embodiment of this invention is found in a process for the preparation of an aralkyl-substituted halogenated unsaturated polybasic acid anhydride which comprises condensing toluene with dichloromaleic anhydride in the presence of benzoyl peroxide at a temperature in the range of from about 50° to about 300° C. and at least as high as the decomposition temperature of said benzoyl peroxide, and recovering the resultant 3-chloro-2-benzylmaleic anhydride.

Other objects and embodiments will be found in the following further detailed description of the present invention.

As hereinbefore set forth, the present invention relates to a process for the preparation of aralkyl-substituted halogenated unsaturated polybasic acid anhydrides. The process is effected by condensing alkylaromatic compounds which are characterized by the presence of at least one hydrogen atom on a carbon atom which is attached to a nuclear carbon atom with a polyhalo-substituted unsaturated polybasic acid anhydride which is characterized by the presence of a chlorine atom attached to each of the doubly-bonded carbon atoms in the unsaturated portion of the compound. The condensation is brought about by the presence of a free radical-generating compound, which acts as an initiator for the reaction.

The initiators which are used in the process of this invention are those which are capable of forming a free radical under the reaction conditions hereinafter set forth in greater detail. These compounds which act to initiate the condensation reaction are free radical generating compounds and will include diazonium compounds, metal-alkyls, and peroxy compounds. Suitable peroxy compounds contain the bivalent radical —O—O— which decomposes to form free radicals which initiate the general reaction of the present invention. Examples of such peroxy compounds are the persulfates, perborates and percarbonates of the alkali metals and ammonium; peracetic acid, persuccinic acid, dimethyl peroxide, diethyl peroxide, di-t-butyl peroxide, dipropyl peroxide, acetyl peroxide, propionyl peroxide, butyryl peroxide, lauroyl peroxide, benzoyl peroxide, Tetralin peroxide, urea peroxide, t-butyl perbenzoate, t-butyl hydroperoxide, methylcyclohexyl hydroperoxide, 2,4-dichlorobenzoyl peroxide, methyl ethyl ketone peroxide, cyclohexanone peroxide, cumene hydroperoxide, diisopropylbenzene hydroperoxide, paramethane hydroperoxide, isopropyl percarbonate, etc. The organic peroxy compounds constituted a preferred class of initiator for use in this invention. Mixtures of peroxy compound catalysts may be employed or the peroxy compounds may be utilized in admixture with various diluents for the process of this invention. Thus organic peroxy compounds which are compounded commercially with various diluents for use as free radical-generating compounds may be used and include benzoyl peroxide compounded with calcium sulfate, benzoyl peroxide compounded with camphor, benzoyl peroxide compounded with hydrogenated terphenyls, benzoyl peroxide compounded with stearic acid, benzoyl peroxide compounded with tricresyl phosphate, benzoyl peroxide compounded with dibutyl phthalate, methyl ethyl ketone peroxide in dimethyl phthalate, cyclohexanone peroxide compounded with dibutyl phthalate, acetyl peroxide in dimethyl phthalate, etc. Only catalytic amounts (less than stoichiometric amounts) need be used in the process.

In selecting the particular condensation temperature for use in the present invention, two considerations must be taken into account. First, sufficient energy by means of heating must be applied to the reaction system so that the reactants, namely, the alkylaromatic compound of the type hereinafter set forth in greater detail and the polyhalo-substituted unsaturated polybasic acid anhydride will be activated sufficiently for condensation to occur when free-radicals are generated by the catalyst. Second, free radical-generating compounds such as peroxy compounds, and particularly organic peroxides, decompose a measurable rate with time in a logarithmic function dependent upon temperature. This rate of decomposition can be and ordinarily is expressed as the half life of a peroxide at a particular temperature. For example, the half life in hours for di-t-butyl peroxide is 17.5 hours at 125° C., 5.3 hours at 135° C., and 1.7 hours at 145° C. (calculated from data for the first 33% decomposition). A reaction system temperature must then be selected so that the free radical generating compound decomposes smoothly with the generation of free radical at a half life which is not too long. In other words, sufficient free radicals must be present to induce the present chain reaction to take place, and these radicals must be formed at a temperature at which the reactants are in a suitable activated state for condensation. When the half life of the free radical-generating compound is greater than 10 hours, radicals are not generated at a sufficient rate to cause the reaction of the process of the present invention to go forward at a practical rate. Thus depending on the particular peroxide, the reaction temperature may be within the range of from about 50° to about 300° C. and at least as high as the decomposition temperature of the catalyst, by which is meant a temperature such that the half life of the free radical-generating compound is not greater than 10 hours. Since the half life for each free radical-generating substance is different at different temperatures, the exact temperature to be utilized in a particular reaction will vary. However, persons skilled in the art are well acquainted with the half life vs. temperature data for different free radical-generating compounds and thus it is within the skill of one familiar with the art to select the particular temperature needed for any particular free radical generator. Generally, the operating temperature does not exceed the temperature at which the half life is not more than 10 hours by more than about 150° C. since free radical-generating compounds decompose rapidly under such conditions. However, in some instances, temperatures as high as 300° C. may be utilized, for example, when the reactor is charged with part of the alkylaromatic compound and the polychloro-substituted unsaturated polybasic acid anhydride and the free radical-generating compound in solution in another portion of the alkylaromatic compound is introduced, usually by means of pressure as a liquid, into the reactor which is maintained at the high temperature. The half life of t-butyl perbenzoate is less than 10 hours at about 110° C. and accordingly when this peroxy compound is used as the initiator for this process, the operating temperature is from about 110° to about 300° C., but generally not greater than about 260° C. An operating temperature of from about 130° to about 300° C., and preferably to about 280° C., is used with di-t-butyl peroxide, and from about 75° to about 300° C., but generally not greater than 225° C. with benzoyl peroxide. Little advantage is gained if the temperature is too high even though the reaction is to become more activated in the presence of the free radical-generating compound decomposing at a high rate since decomposition of the polychloro substituted unsaturated polybasic acid anhydride takes place at a temperature above about 300° C. In the preferred embodiment of this invention, the diacyl peroxides such as acetyl peroxide, benzoyl peroxide, etc., are preferred over other peroxides such as di-t-butyl peroxide and t-butyl perbenzoate, inasmuch as the alcohol by-products from the latter type of peroxides will undergo reaction with a portion of the anhydrides thereby diminishing the yield of the desired product.

The concentration of the initiator which is employed in the process of the present invention may vary over a rather wide range, but for reasons of economics, it is desirable to use lower concentrations of initiators, such as from about 0.1% up to about 10% of the total weight of the alkylaromatic compound and the polyhalo-substituted unsaturated polybasic acid anhydride charged to the process. The reaction time may vary and may be within the range of from less than 1 minute to several hours, depending upon the reaction conditions of and the half life of the free radical-generating compounds as hereinbefore set forth. Generally speaking a contact time of at least 10 minutes is preferred.

Examples of alkylaromatic compounds, which may be employed as one of the starting materials of the present process which are characterized by the presence of at least one hydrogen atom on a carbon atom attached to a nuclear carbon atom, will include primary and secondary alkylbenzenes such as toluene, o-xylene, m-xylene, p-xylene, mesitylene, pseudocumene, hemimellitene, tetramethylbenzene, pentamethylbenzene, ethylbenzene, o-diethylbenzene, m-diethylbenzene, p-diethylbenzene, n-propylbenzene, the isomeric di-n-propylbenzenes, isopropylbenzenes, cymenes, n-butylbenzene, the isomeric di-n-butylbenzenes, sec - butylbenzenes, 1 - methylnaphthalene, 2 - methylnaphthalene, 1,2 - dimethylnaphthalene, 1-ethylnaphthalene, 2-ethylnaphthalene, 1,2-diethylnaphthalene, 1-n-propylnaphthalene, 2 - n - propylnaphthalene, etc.; nuclear halogenated derivatives of the aforementioned alkylaromatic compounds such as o-chlorotoluene, p-chlorotoluene, m-chlorotoluene, 2,3-dichlorotoluene, 2,4-dichlorotoluene, 2,6 - dichlorotoluene, 2,3,4 - trichlorotoluene, 2,4,6 - trichlorotoluene, o-chloroethylbenzene, m-chloroethylbenzene, p - chloroethylbenzene, 2,3 - dichloroethylbenzene, 2,4 - dichloroethylbenzene, 2,6 - dichloroethylbenzene, 2,4,6 - trichloroethylbenzene, o-chloro-n-propylbenzene, p - chloro-n-propylbenzene, m-chloro-n-propylbenzene, 2,3 - dichloro-n-propylbenzene, 2,4 - dichloro - n - propylbenzene, 2,6-dichloro-n-propylbenzene, 2,3,4 - trichloro - n - propylbenzene, 2,4,6-trichloro-n-propylbenzene, the analogous isopropyl derivatives, o-bromotoluene, p-bromotoluene, m-bromotoluene, 2,3-dibromotoluene, 2,4 - dibromotoluene, 2,6-dibromotoluene, 2,3,4 - tribromotoluene, 2,4,6-tribromotoluene, o-bromoethylbenzene, m-bromoethylbenzene, p-bromoethylbenzene, 2,3-dibromoethylbenzene, 2,4-dibromoethylbenzene, 2,6-dibromoethylbenzene, 2,4,6-tribromoethylbenzene, etc., aromatic ketones characterized by the presence of at least one hydrogen atom on an α-carbon atom such as acetyltoluene, phenylacetone, tolylacetone, xylenylacetones, ethylbenzylacetone, etc.

Specific examples of polyhalo-substituted unsaturated polybasic acid anhydrides characterized by the presence of a chlorine atom on each of the doubly-bonded carbon atoms will include dichloromaleic anhydride,
2,3-dichloroglutaconic anhydride,
(1,2-dichlorovinyl)succinic anhydride,
(1,2,2-trichlorovinyl)succinic anhydride,
(2,3-dichloroally)succinic anhydride,
(2,3,3-trichloroallyl)succinic anhydride,
2-(1,2-dichlorovinyl)glutaconic anhydride,
2-(1,2,2-trichlorovinyl)glutaconic anhydride,
2-(2,3-diallyl)glutaconic anhydride,
2-(2,3,3-trichloroallyl)glutaconic anhydride,
3-(1,2-dichlorovinyl)glutaconic anhydride,
3-(1,2,2-trichlorovinyl)glutaconic anhydride,
3-(2,3-dichloroallyl)glutaconic anhydride,
3-(2,3,3-trichloroallyl)glutaconic anhydride.

It is also contemplated within the scope of this invention that polychloro-substituted anhydrides of monobasic unsaturated carboxylic acids such as 2,3-dichloroacrylic anhydride may be also used, although not necessarily with equivalent results. It is to be understood that the aforementioned specific examples of alkylaromatic compounds and polyhalo, particularly polychloro, substituted unsaturated polybasic acid anhydrides are only representative of the class of compounds which may be employed, and that the present invention is not necessarily limited thereto.

The process of this invention may be effected in any suitable manner and may comprise either a batch or continuous type operation. For example, when a batch type operation is used, the quantity of the starting materials comprising the alkylaromatic compound containing a hydrogen atom on a carbon atom which is attached to a nuclear carbon atom and the polyhalo-substituted unsaturated polybasic acid anhydride which contains at least one chlorine atom on each of the doubly-bonded carbon atoms is placed in an appropriate apparatus along with the free radical-generating compound. If the reaction is to be effected at superatmospheric pressure, the reaction vessel may comprise an autoclave of the rotating or mixing type. The autoclave is sealed and an inert gas such as nitrogen is pressed in until an initial operating pressure is reached. The operating pressure may range from 1 to 100 atmospheres or more and is usually that amount of pressure which is required to maintain a major portion of the reactants in the liquid phase. The autoclave and contents thereof are then heated to the predetermined operating temperature which is in a range hereinbefore set forth and maintained thereat for the predetermined residence time. Upon completion of the residence period, heating is discontinued, the apparatus and contents thereof are allowed to return to room temperature, the excess pressure is discharged, and the vessel is opened. The liquid product is recovered and subjected to conventional means of separation and purification including extraction, washing, drying, evaporation, crystallization, distillation, usually under reduced pressure, etc., whereby the desired product comprising the aralkyl substituted halogenated unsaturated polybasic acid anhydride is recovered.

It is also contemplated within the scope of this invention that the process may be effected in a continual manner of operation. When such a type of operation is employed, the starting materials comprising the alkylaromatic compound and the polyhalo-substituted unsaturated polybasic acid anhydride are continuously charged to the reaction zone which is maintained at the proper operating conditions of temperature and pressure. In addition, the free radical-generating compound is also charged thereto through a separate line or, if so desired, it may be admixed with one or both of the starting materials prior to entry into said reactor and charged thereto along with said reactant. Upon completion of the desired residence time, the reactor effluent is continuously withdrawn and subjected to separation steps similar to those hereinbefore set forth, whereby the desired product is recovered and removed to storage while any unreacted starting materials are recycled to form a portion of the feed stock.

Examples of aralkyl substituted halogenated unsaturated polybasic acid anhydrides which may be prepared according to the process of this invention include 3-chloro-2-benzylmaleic anhydride,
3-chloro-2-p-methylbenzylmaleic anhydride,
3-chloro-2-o-chlorobenzylmaleic anhydride,
3-chloro-2-m-chlorobenzylmaleic anhydride,
3-chloro-2-p-chlorobenzylmaleic anhydride,
3-chloro-2-(2,4,6-trichlorobenzyl)maleic anhydride,
3-chloro-2-(2,6-dichlorobenzyl)maleic anhydride,
3-chloro-2-α-methylbenzylmaleic anhydride,
3-chloro-2-naphthylmaleic anhydride,
3-chloro-2-α-methylbenzylmaleic anhydride,
3-chloro-2-benzylglutaconic anhydride,
3-chloro-2-p-chlorobenzylglutaconic anhydride,
3-chloro-2-o-chlorobenzylglutaconic anhydride,
3-chloro-2-m-chlorobenzylglutaconic anhydride,
3-chloro-2-p-methylbenzylglutaconic anhydride,
3-chloro-2-o-methylbenzylglutaconic anhydride,
3-chloro-2-m-methylbenzylglutaconic anhydride,
3-chloro-2-(2,4,6-trichlorobenzyl)glutaconic anhydride,
3-chloro-2-(2,6-dichlorobenzyl)glutaconic anhydride,
3-chloro-2-α-methylbenzylglutaconic anhydride,
3-chloro-2-naphthylglutaconic anhydride,
3-chloro-2-α-methylbenzylglutaconic anhydride, etc. It is to be understood that the aforementioned compounds are only representative of the class of compounds which may be prepared, and that the present invention is not necessarily limited thereto.

In addition to the above set forth compounds it is contemplated within the scope of this invention that diaralkyl-substituted unsaturated polybasic acid anhydrides may also be obtained by utilizing a very large excess of the alkylaromatic reactant over the polyhalo-substituted polybasic acid anhydride reactant. Some examples of these compounds would be 2,3-dibenzylmaleic anhydride, 2,3-di-(p-methylbenzyl)maleic anhydride, 2,3-dibenzylglutaconic anhydride, 2,3-di-(α-methylbenzyl)maleic anhydride, 2,3-di-(α-methylbenzyl)glutaconic anhydride, etc.

The following examples are given to illustrate the process of the present invention which, however, are not intended to limit the generally broad scope of the present invention in strict accordance therewith.

EXAMPLE I

In this example 20 g. (0.12 mol) of dichloromaleic anhydride, 100 g. (1.09 mols) of toluene, and 2 g. (0.01 mol) of benzoyl peroxide were placed in the glass liner of a rotating autoclave. The autoclave was sealed and nitrogen pressed in until an initial pressure of 30 atmospheres was reached. The autoclave was then heated to a temperature of 80° C. and maintained in a range of from 80° to 100° C. for a period of 4 hours, the maximum pressure at this temperature reaching 42 atmospheres. At the end of the 4 hour period, heating was discontinued and the autoclave was allowed to return to room temperature, the final pressure at room temperature being 30 atmospheres. The excess pressure was discharged and the reaction product was recovered.

The liquid product was subjected to fractional distillation under reduced pressure, the bottoms from said distillation being a dark red-orange liquid which crystallized on standing. Recrystallization of the product utilizing a mixture of benzene and cyclohexane yielded white powdery crystals having a melting point of 57°–58° C., said crystals being 3-chloro-2-benzylmaleic anhydride.

EXAMPLE II

A mixture comprising 21 g. (0.13 mol) of dichloromaleic anhydride, 54 g. (0.43 mol) of p-chlorotoluene and 2 g. (0.01 mol) of benzoyl peroxide was placed in the glass liner of a rotating autoclave. The autoclave was sealed and nitrogen pressured in until an initial operating pressure of 30 atmospheres was reached. The autoclave was then heated to a temperature of 80° C. and maintained in a range of from 80° to 100° C. for a period of 4 hours, the maximum pressure at this temperature reaching 42 atmospheres. At the end of the 4 hour period, heating was discontinued and the autoclave allowed to return to room temperature. After discharging the excess pressure which was 30 atmospheres at room temperature, the autoclave was opened and the reaction product was recovered therefrom.

The liquid product from the liner was extracted with 10% sodium hydroxide and thereafter the aqueous solution was extracted with ethyl ether. The ether solution was evaporated and the residue was added to the alkali-insoluble layer, the latter consisting chiefly of unreacted p-chlorotoluene. The alkali solution was acidified with hydrochloric acid and the liquid lower layer which separated out was taken up with ether. After evaporation of the ether, there remained 21 g. of a yellow liquid. The mass spectrum of the alkali product disclosed that the heaviest component had 3 molecular ion peaks, implying the presence of two chlorine atoms at m/e 256, 258, and 260. The peak heights were in the correct proportion for $Cl^{35}$, $Cl^{35}$–$Cl^{37}$, and $Cl^{37}$. These data are in agreement with the structure 3-chloro-2-p-chlorobenzylmaleic anhydride (molecular weight, 256.9).

EXAMPLE III

In this example a mixture of 98 g. (0.5 mol) of 2,4,6-trichlorotoluene, 20 g. (0.12 mol) of dichloromaleic anhydride, and 2 g. (0.01 mol) of benzoyl peroxide is placed in the glass liner of a rotating autoclave which is thereafter sealed. Nitrogen is pressed in until an initial operating pressure of 30 atmospheres is reached, and the autoclave is then heated to a temperature of 80° C.

After maintaining the autoclave at a temperature in the range of from 80° to 100° C. for a period of 4 hours, heating is discontinued and the autoclave is allowed to return to room temperature. The excess pressure is discharged and the autoclave is opened. The reaction mixture is recovered, extracted with sodium hydroxide and thereafter extracted with ethyl ether. The ether solution is evaporated and the residue which remains therefrom is added to the alkali-insoluble layer. The alkali solution is then acidified with hydrochloric acid and the liquid lower layer which will separate out is taken up with ethyl ether. The ether is then evaporated and the desired product comprising 3-chloro-2-(2,4,6-trichlorobenzyl) maleic anhydride is recovered therefrom.

EXAMPLE IV

In this example a mixture of 92 g. (1.0 mol) of toluene, 27 g. (0.15 mol) of 2,3-dichloroglutaconic anhydride, and 2.4 g. (0.02 mol) of acetyl peroxide is placed in the glass liner of a rotating autoclave which is thereafter sealed and nitrogen is pressed in until an initial operating pressure of 30 atmospheres is reached. The autoclave is then heated to a temperature of 100° C. for a period of 4 hours, the maximum pressure at this temperature reaching approximately 40 atmospheres. Upon completion of the desired residence time, heating is discontinued, the autoclave is allowed to return to room temperature, the excess pressure is discharged and the autoclave is opened. The reaction product is recovered and treated in a manner similar to that set forth in the above examples whereby the desired product comprising 3-chloro-2-benzylglutaconic anhydride is recovered.

EXAMPLE V

In this example 107 g. (1.0 mol) of ethylbenzene, 20 g. (0.12 mol) of dichloromaleic anhydride and 2 g. (0.01 mol) of benzoyl peroxide are placed in the glass liner of a rotating autoclave and treated in a manner similar to that set forth in the above examples. After heating the autoclave to a temperature of about 100° C., to a nitrogen pressure of 30 atmospheres for a period of 4 hours, heating is discontinued, the autoclave is allowed to return to room temperature, the excess pressure is discharged, and the reaction product is recovered. The product is worked up in a manner similar to that set forth in the above examples, analysis of the final product disclosing the presence of the desired compound comprising 3-chloro-2-α-methylbenzylmaleic anhydride.

I claim as my invention:

1. A process for the preparation of an aralkyl-substituted halogenated alpha,beta olefinically unsaturated polybasic acid anhydride which comprises condensing an alkylaromatic compound having at least one hydrogen atom on a carbon attached to a nuclear carbon atom selected from the group consisting of loweralkylbenzene, lower alkylnaphthalene, nuclear halogenated derivatives thereof, phenyl acetone and loweralkylphenylacetone with a polyhalo-substituted alpha,beta olefinically unsaturated polybasic acid anhydride selected from the group consisting of dichloromaleic and 2,3-dichloroglutaconic anhydride in the presence of a free radical-generating peroxy compound at a temperature in the range of from about 50° to about 300° C. and at least as high as the decomposition temperature of said free radical generating peroxy compound.

2. The process as set forth in claim 1 in which said free radical-generating compound is an organic peroxide.

3. The process as set forth in claim 2 in which said free radical-generating compound is an acetyl peroxide.

4. The process as set forth in claim 2 in which said free radical-generating compound is benzoyl peroxide.

5. The process as set forth in claim 1 in which said alkylaromatic compound is toluene, said polyhalo-substituted unsaturated polybasic acid anhydride is dichloromaleic anhydride and said aralkyl-substituted halogenated unsaturated polybasic anhydride is 3-chloro-2-benzylmaleic anhydride.

6. The process as set forth in claim 1 in which said alkylaromatic compound is p-chlorotoluene, said polyhalo-substituted unsaturated polybasic acid anhydride is dichloromaleic anhydride and said aralkyl-substituted halogenated unsaturated polybasic anhydride is 3-chloro-2-p-chlorobenzylmaleic anhydride.

7. The process as set forth in claim 1 in which said alkylaromatic compound is 2,4,6-trichlorotoluene, said polyhalo-substituted unsaturated polybasic acid anhydride is dichloromaleic anhydride and said aralkyl substituted halogenated unsaturated polybasic anhydride is 3-chloro-2-(2,4,6-trichlorobenzyl)maleic anhydride.

8. The process as set forth in claim 1 in which said alkylaromatic compound is toluene, said polyhalo-substituted unsaturated polybasic acid anhydride is 2,3-dichloroglutaconic anhydride and said aralkyl-substituted halogenated unsaturated polybasic anhydride is 3-chloro-2-benzylglutaconic anhydride.

9. The process as set forth in claim 1 in which said alkylaromatic compound is ethylbenzene, said polyhalo-substituted unsaturated polybasic acid anhydride is dichloromaleic anhydride and said aralkyl-substituted halogenated unsaturated polybasic anhydride is 3-chloro-2-α-methylbenzylmaleic anhydride.

References Cited

UNITED STATES PATENTS 3,474,110   10/1969   Merijan et al. _____ 260—346.8

DONALD G. DAUS, Primary Examiner

B. DENTZ, Assistant Examiner

U.S. Cl. X.R.

252—8.1; 260—346.8, 502 R, 610, 346.6